(12) United States Patent
Birman

(10) Patent No.: US 7,048,397 B2
(45) Date of Patent: May 23, 2006

(54) ILLUMINATION OF GAUGE INDICATOR SCALE

(75) Inventor: Vyacheslav B. Birman, Rochester Hills, MI (US)

(73) Assignee: Siemens VDO Automotive Corporation, Auburn Hills ( * ) Notice: Subject to any disclaimer, the term of this patent is extended or adjusted under 35 U.S.C. 154(b) by 0 days.

(21) Appl. No.: 10/760,755

(22) Filed: Jan. 20, 2004

(65) Prior Publication Data

US 2004/0228104 A1 Nov. 18, 2004

Related U.S. Application Data

(60) Provisional application No. 60/470,123, filed on May 13, 2003.

(51) Int. Cl.
*G01D 11/28* (2006.01)
*F21V 9/16* (2006.01)

(52) U.S. Cl. .............. 362/26; 362/30; 362/84; 362/489; 116/DIG. 5; 116/DIG. 36

(58) Field of Classification Search .......... 362/23, 362/26–30, 471, 488, 84, 489; 116/286–287, 116/DIG. 5, DIG. 36
See application file for complete search history.

(56) References Cited

U.S. PATENT DOCUMENTS

| | | | | |
|---|---|---|---|---|
| 2,795,069 A | * | 6/1957 | Hardesty | 40/546 |
| 4,975,808 A | * | 12/1990 | Bond et al. | 362/609 |
| 5,047,761 A | * | 9/1991 | Sell | 340/815.42 |
| 5,134,549 A | | 7/1992 | Kazuaki | |
| 5,896,229 A | * | 4/1999 | Rudisill et al. | 359/599 |
| 5,911,492 A | * | 6/1999 | Perry et al. | 362/26 |
| 5,915,822 A | * | 6/1999 | Ogura et al. | 362/26 |
| 6,017,127 A | * | 1/2000 | Kurple | 362/29 |
| 6,025,820 A | * | 2/2000 | Salmon et al. | 345/75.1 |
| 6,036,326 A | * | 3/2000 | Yoshikawa et al. | 362/23 |
| 6,183,099 B1 | * | 2/2001 | Garay et al. | 362/26 |
| 6,302,551 B1 | * | 10/2001 | Matumoto | 362/27 |
| 6,520,654 B1 | * | 2/2003 | Angell et al. | 362/23 |
| 6,750,779 B1 | * | 6/2004 | Wada et al. | 340/815.55 |
| 2002/0135994 A1 | * | 9/2002 | Ikarashi et al. | 362/23 |

FOREIGN PATENT DOCUMENTS

| | | |
|---|---|---|
| DE | 3703847 | 8/1988 |
| DE | 4122118 | 1/1993 |
| DE | 195 41 875 A | 5/1996 |
| EP | 0 367 953 A | 5/1990 |

(Continued)

OTHER PUBLICATIONS

Translation of DE 195 41 875 A.

(Continued)

*Primary Examiner*—Alan Cariaso
*Assistant Examiner*—Jason Han

(57) ABSTRACT

An instrument gauge display for a vehicle dash includes a transparent dial having an upper surface partially covered by black paint and a lower surface covered with white paint. Uncovered areas on the upper surface define a plurality of graphical images that indicate a vehicle operating condition. A light guide, supported within a light housing, is positioned underneath the dial. The light housing and at least one light source is mounted to a printed circuit board, which is supported underneath the light guide by a vehicle structure. The light guide includes a plurality of scattering elements that are positioned generally underneath each of the graphical areas on the dial. The light source cooperates with the light guide and scattering elements to improve the light efficiency.

19 Claims, 3 Drawing Sheets

FOREIGN PATENT DOCUMENTS

| | | |
|---|---|---|
| EP | 0 732 679 A | 9/1996 |
| FR | WO9402777 A1 * | 2/1994 |
| JP | 95099404 B2 | 10/1995 |
| JP | 11273435 A * | 10/1999 |
| JP | 2000019994 | 1/2000 |
| JP | 2001266625 A * | 9/2001 |
| WO | WO 94/02777 | 2/1994 |
| WO | WO 94/02778 | 2/1994 |

OTHER PUBLICATIONS

Int'l Search Report dated Sep. 20, 2004.

* cited by examiner

ILLUMINATION OF GAUGE INDICATOR SCALE

CROSS-REFERENCE TO RELATED APPLICATIONS

The application claims priority to U.S. Provisional Application No. 60/470,123, which was filed on May 13, 2003.

BACKGROUND OF THE INVENTION

This invention relates to a method and apparatus for illuminating a graphical display with a light source and a light guide including scattering elements to increase the light efficiency for an instrument gauge display.

An instrument cluster for a vehicle is traditionally located on a vehicle dashboard and includes several gauges or dials that indicate various vehicle operating conditions. For example, an instrument cluster may include a speedometer, a tachometer, an engine condition indicator, and other known types of gauges. These gauges are illuminated to facilitate reading of the information by the vehicle occupants.

Instrument clusters include a printed circuit board (PCB) with electronic components for controlling operation of the instrument clusters. Light sources are typically mounted to the PCB. A light box or light housing is used to contain the light produced by the light sources inside the instrument cluster and prevents unwanted light leakage. The light housing is also used to distribute the light from the light source over the graphical area to be illuminated.

The instrument cluster further includes display or dial on which the graphical image is formed or mounted. Typically, the dial is formed from a transparent material that has an upper surface partially covered by a layer black paint and a lower surface covered by a layer of white paint. The uncovered upper surface areas define the graphical images. During reduced light levels of operation, it is common to illuminate all of the area underneath the graphical images.

Improvements in the area of optics over the years has resulted in a significant increase in light output from light sources. This has significantly reduced the number of light sources needed to adequately illuminate a graphical display. However, this increased light output has also made it more difficult to evenly distribute luminance over the display without requiring some form of compensation.

Compensation usually involves the addition of coatings or layers of material applied to at least one of the gauge components to absorb light in certain areas. In one example, an additional layer of black dots is applied to the dial in the areas of bright illumination, i.e. the areas closest to the light source. This layer of dots is typically placed on top of the white paint layer, which is applied to the bottom surface of the dial. While this configuration provides for more even illumination, it is disadvantageous because light efficiency is decreased due to the light absorption.

Thus, there is a need for an instrument gauge display that provides a more even and bright graphical illumination in addition to overcoming the other above-mentioned deficiencies.

SUMMARY OF THE INVENTION

An instrument gauge display cluster for a vehicle instrument panel includes a dial supported by a light housing. The dial includes a plurality of graphical images that indicate a vehicle operating condition. The light housing is mounted to a printed circuit board, which is supported by a vehicle structure. A light source is also mounted to the printed circuit board and is used to illuminate the graphical images. A light guide is mounted within the light housing and is used to direct light from the light source toward the graphical images. The light guide includes a plurality of scattering elements that are positioned generally underneath the graphical images. Due to the position of the scattering elements, the area underneath the background (the non-graphic area) of the dial is illuminated much less than the area of the graphical images. Thus, the scattering elements cooperate with the light source and light guide to more effectively control direction of the light toward the graphical images, which increases light efficiency.

In one disclosed embodiment, each of the scattering elements comprises a discrete predetermined area formed on an upper or lower surface of the light guide. The predetermined area includes a layer of white paint. In order to avoid compensation, the pattern of white paint can be varied depending upon the location of the predetermined area on the light guide. In other words, predetermined areas that are closer to the light source would have a different pattern of paint application than predetermined areas that are farther away from the light source.

In one disclosed embodiment, each of the scattering elements comprises a textured surface formed on an upper or lower surface of the light guide. The light guide is preferably formed from a light transparent material having a first texture. The scattering elements are formed as discrete, predetermined areas that have a second texture that is different than the first texture.

Further, in one disclosed embodiment, the thickness of the light guide is varied to decrease leakage of light from the light housing. Preferably, the thickness of the light guide decreases as the distance from the light guide relative to the light source(s) increases.

The subject system and method for illuminating a graphical image provides for more even illumination and increases light efficiency brightness while eliminating the need for compensation layers used in prior systems. These and other features of the present invention can be best understood from the following specifications and drawings, the following of which is a brief description.

DETAILED DESCRIPTION OF A PREFERRED EMBODIMENT

Figure 1A:
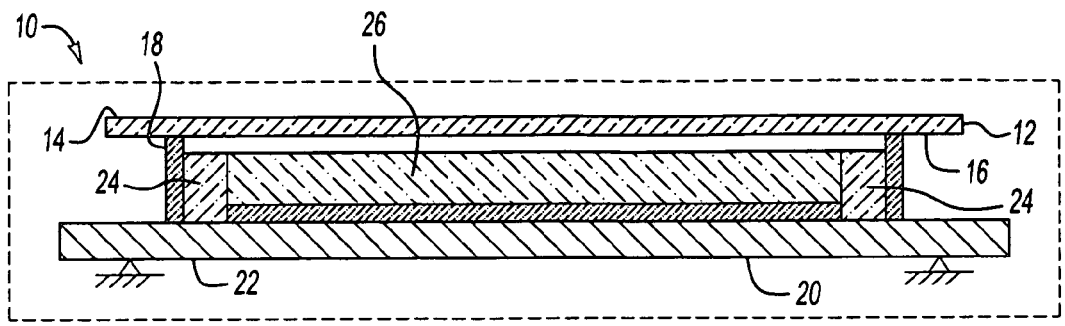
FIG. 1A is a cross-sectional view of an instrument gauge display incorporating the subject invention.

An instrument cluster including at least one instrument gauge display assembly is shown generally at 10 in FIG. 1A. The assembly 10 includes a transparent dial 12 having an upper dial surface 14 and a lower dial surface 16. The dial 12 includes a plurality of graphical images that indicate a vehicle operating conditions. The dial 14 is supported on a light housing 18 that is mounted to a printed circuit board (PCB) 20. The PCB 20 includes a plurality of electrical components (not shown) that control the operational characteristics of the display assembly 10. The PCB 20 is mounted to a vehicle structure 22.

The display assembly 10 also includes at least one light source 24 that is mounted at least partially within the light housing 18 and is operably connected to the PCB 20. A light guide 26 is mounted within the light housing 18 underneath the dial 12. The light guide 26 is preferably formed from a light transparent material and the light housing 18 is preferably formed from a white opaque material to reflect light. The light housing 18 prevents undesirable light leakage and cooperates with the light guide 26 and light source 24 to direct the light to illuminate the graphical images.

Figure 1B:
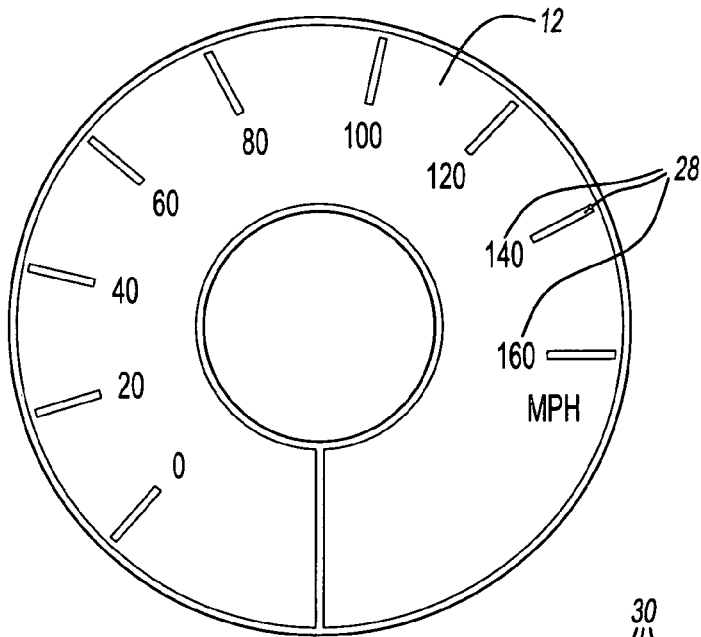
FIG. 1B is a tope view of the display of FIG. 1A.

The upper dial surface 14 is partially covered by a layer of black paint and the lower dial surface 16 is covered by a semitransparent layer of white or colored paint. Uncovered areas 28 on the upper dial surface 14 define the graphical images, see FIG. 1B. These graphical images can take the form of numbers, letters, tick marks, geometric figures, pictures, etc. During daytime operating conditions, ambient light is partially reflected from the semitransparent layer of white or colored paint to provide white or colored graphics on the black background.

It is common to illuminate all area underneath the uncovered areas 28, i.e. graphical areas 28, during nighttime or low-ambient light operating conditions. As discussed above, in order to provide even illumination over the graphical areas 28, an additional compensation layer of black dots can be applied in areas of bright illumination, i.e. areas closes to the light source 24. This layer is typically placed on top of the white layer. This use of this additional layer decreases light efficiency.

Figure 2:
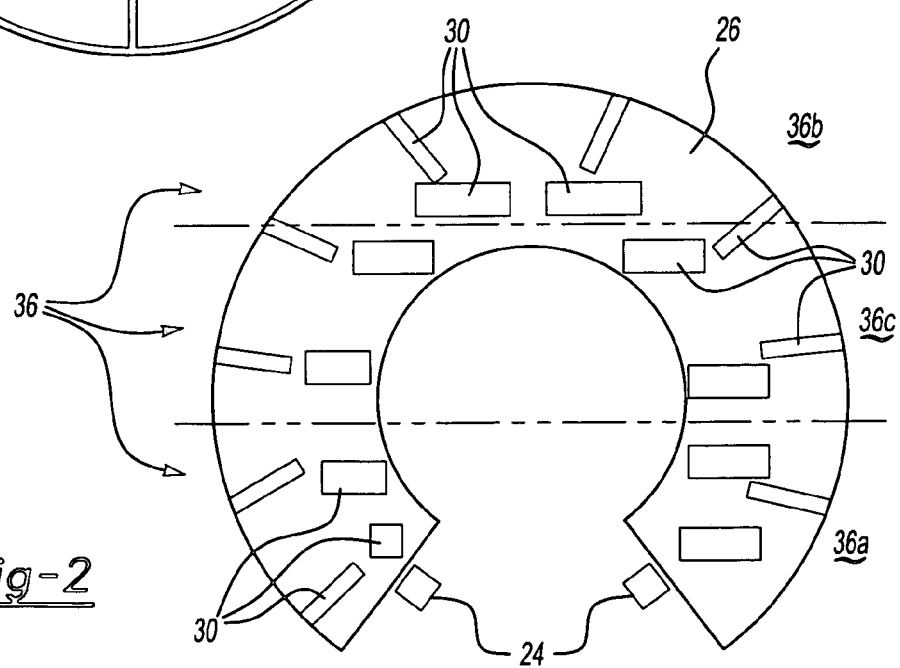
FIG. 2 is a top view of a light guide including a plurality of scattering elements from the display shown in FIG. 1A.

The subject invention seeks to increase light efficiency by placing a plurality of scattering elements 30 on the light guide 26, see FIG. 2. The scattering elements 30 are only placed on the light guide 26 in areas underneath the graphical areas 28. Thus, at least some portion of a scattering element 30 is preferably positioned directly underneath each one of the graphical areas 28. The scattering elements 30 cooperate with the light sources 24 to more effectively control direction of the light toward the graphical areas 28. Light efficiency is increased because areas underneath the background, i.e. non-graphical areas, are illuminated much less than the graphical areas 28.

The scattering elements 30 are preferably formed as a plurality of discrete predetermined areas 32 (see FIGS. 3A–3D) on the light guide 26. In the embodiment shown in FIG. 3A, each predetermined area 32 includes a layer of white paint that is applied evenly on a lower surface of the light guide 26. The layer of white paint comprises a solid, continuous layer 34, i.e. a 100% filled area. While this configuration increases the light efficiency, if this configuration is used for all of the scattering elements 30 on the light guide 26, then some compensation is still required. The area on the light guide 26 that is farthest away from the light sources 24 tends to be dimmer than areas closest to the light sources 24.

In order to eliminate the need for all compensation, it is preferable to divide the light guide 26 and associated scattering elements 30 into a plurality of zones 36. Each zone 36 includes set of scattering elements 30 that have a unique paint pattern applied to the discrete predetermined areas in the respective zone 36. While any number of zones 36 could be used, preferably the light guide 26 is divided into at least three (3) zones 36. A bright zone 36a is closest to the light sources 24, a dim zone 36b is the farthest away from the light sources 24, and an intermediate zone 36c is positioned between the bright 36a and dim 36b zones.

Figure 3A:
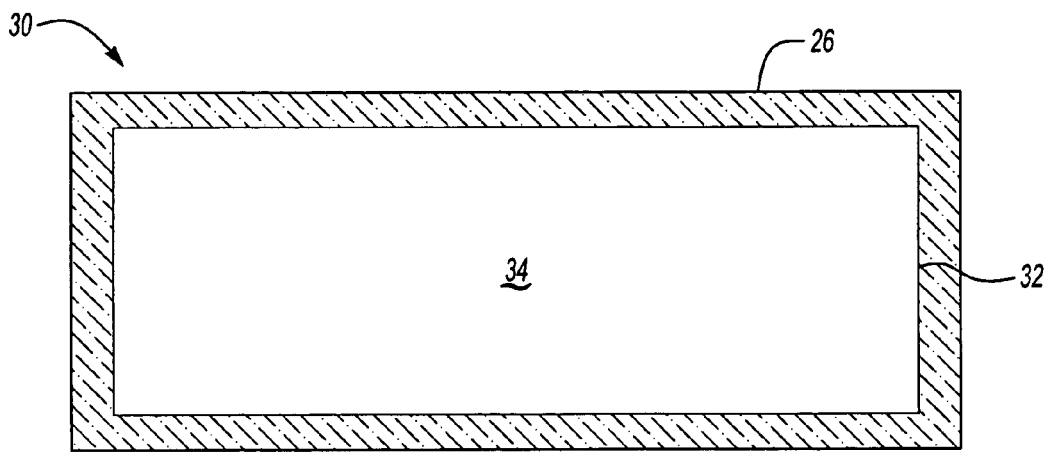
FIG. 3A is a schematic view of one embodiment of a scattering element as shown in FIG. 2.
Figure 3B:
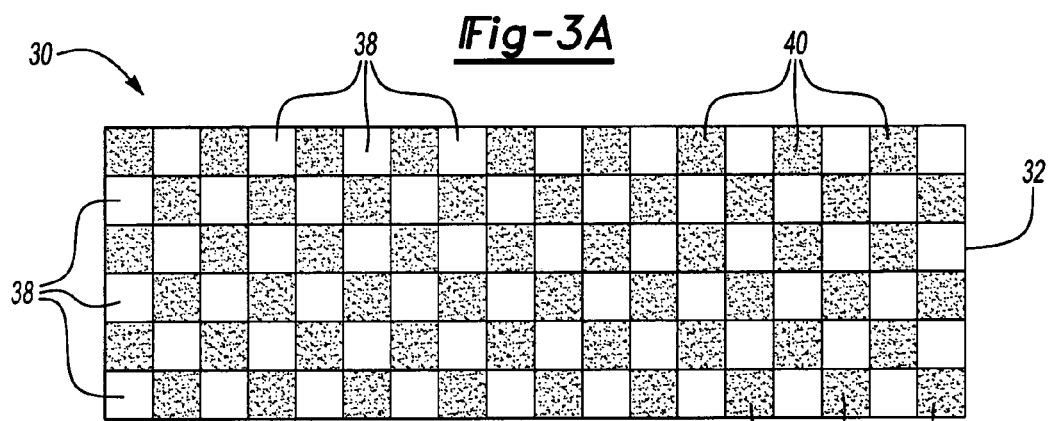
FIG. 3B is a schematic view of another embodiment of a scattering element as shown in FIG. 2.
Figure 3C:
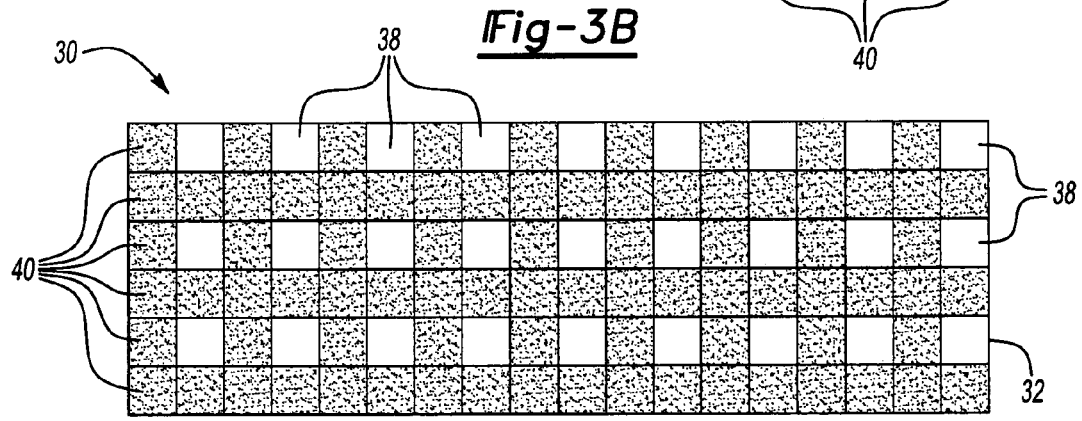
FIG. 3C is a schematic view of another embodiment of a scattering element as shown in FIG. 2.

In the dim zone 36b, the layer of paint is applied as shown in FIG. 3A with a solid, continuous layer 34 of white paint. In the intermediate zone 36c, the layer of white paint is applied as a series of white dots 38, see FIG. 3B. The white dots 38 are applied in a symmetrical or non-symmetrical pattern and are interspaced with non-painted areas 40. The non-painted areas 40 are simply uncovered areas of the light transparent light guide 26. In the bright zone 36a, the layer of white paint is also applied as a series of white dots 38 interspaced with non-painted areas 40. The number or concentration of white dots 38 in the bright zone 36a is less than the number or concentration of white dots 38 in the intermediate zone 36c, see FIG. 3C.

Figure 3D:
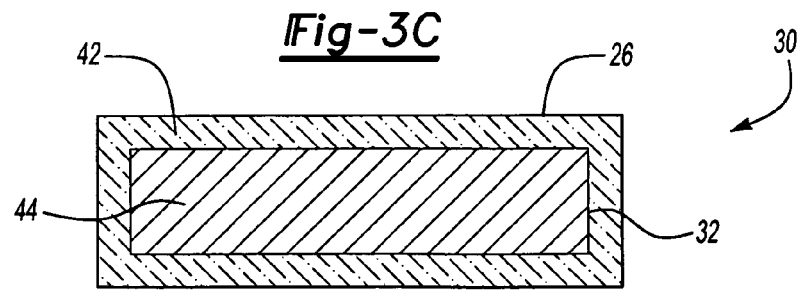
FIG. 3D is a schematic view of another embodiment of a scattering element as shown in FIG. 2.

Instead of using a layer of paint for the plurality of discrete predetermined areas 32, varying textured surfaces could also be used. As shown in FIG. 3D, the light guide 26 is comprised of a first material having a first textured surface 42. The discrete predetermined areas 32 are formed with a second textured surface 44 that is different from the first textured surface 42. The material forming the first and second textured surfaces 42, 44 can be the same type of material with varying degrees of surface roughness or can be different types of materials. The second textured surface 44 can be applied to either the lower or upper surface of the light guide 26.

Figure 4A:
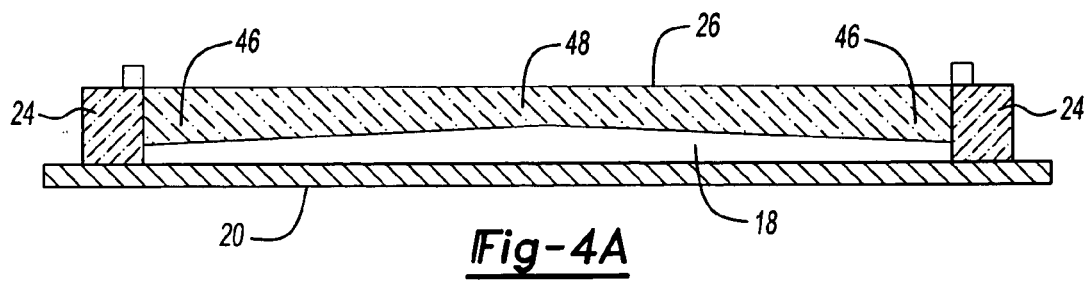
FIG. 4A is a cross-sectional view of the instrument gauge display of FIG. 1 including one embodiment of a varying thickness light guide.
Figure 4B:
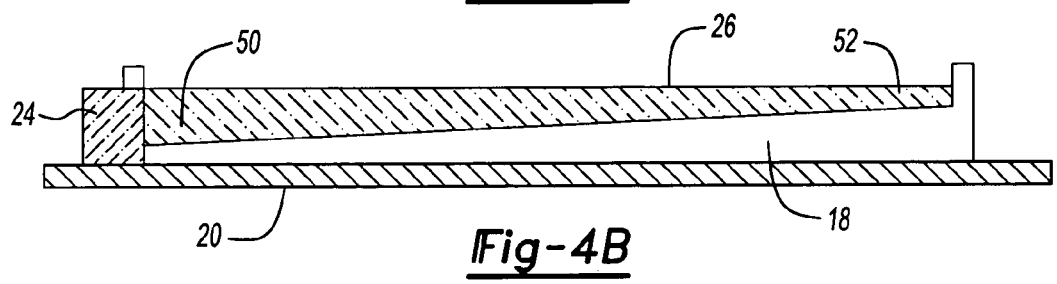
FIG. 4B is a cross-sectional view of the instrument gauge display of FIG. 1 including another embodiment of a varying thickness light guide.

In order to decrease light leakage of light through the light guide 26, the light guide 26 is preferably formed with a variable thickness as shown in FIGS. 4A and 4B. This variable thickness can be used in addition to or separate from the scattering elements 30. In the embodiment shown in FIG. 4A, the display includes two (2) light sources 24. The light guide 26 is thickest at portions 46 closest to the light sources and is thinnest at a portion 48 furthest away from the light sources 24. Portion 48 is located near the middle of the light guide 26 due to the placement of the light sources 24 near the edges of the light guide 26. The thickness is infinitely variable along the length of the light guide 26. The light housing 18 also varies in thickness to provide support for the light guide 26 along the length of the light guide 26.

In the configuration shown in FIG. 4B, the display includes a single light source 24 and the light guide 26 has an infinitely variable thickness extending from an inner diameter portion 50 to an outer diameter portion 52. The light guide 26 is thickest at the inner diameter portion 50 closest to the light source 24 and is thinnest at the outer diameter portion 52 furthest away from the light source 24.

The light housing 18 also varies in thickness to provide support for the light guide 26 along the length of the light guide 26.

Color of the nighttime or reduced ambient light operating conditions, depends on the emission spectrum of the light source 24. In order to decrease influence of this dependence, the scattering elements 30 can be made from a fluorescent paint. Quantum efficiency of luminescent, which is the ratio of radiated photons to the number of photons fault on the surface, depends on the illumination spectrum. However, the luminescence spectrum, i.e. observed color, does not depend on the illumination spectrum. The fluorescent paint can be applied to either the lower or upper surface of the light guide 26.

Figure 5A:
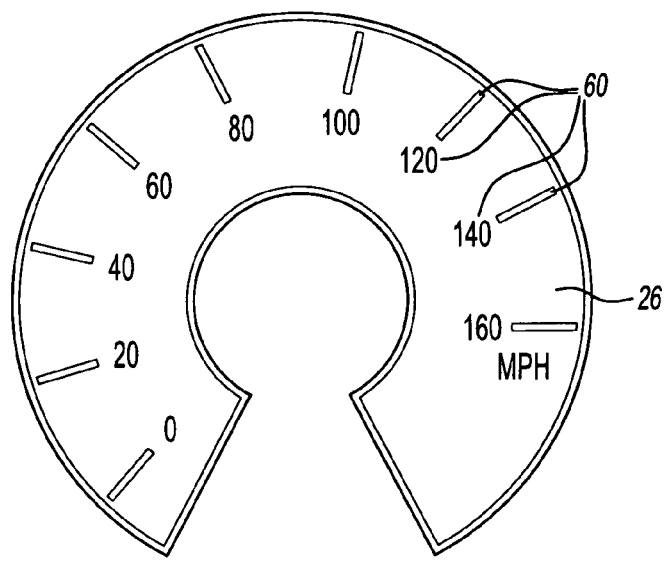
FIG. 5A is a top view of the instrument gauge display of FIG. 1 with the light guide including a layer of fluorescent paint forming a graphical display.
Figure 5B:
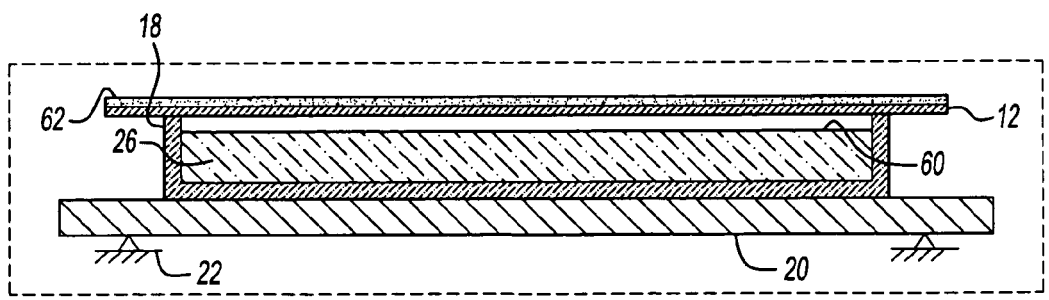
FIG. 5B is a cross-sectional view of the instrument gauge display of FIG. 5A with the light guide including a layer of fluorescent paint forming a graphical display.

In the configuration of FIGS. 5A and 5B, a layer of fluorescent paint 60 is applied on the top surface of the light guide 26 to form the graphical areas 28. This means that the graphical areas can be printed on the upper surface of the light guide 26 with the paint itself. In this configuration the dial 12 is a flat, no-graphics dial with a layer of anisotropic film 62. Preferably, Vikuiti™ XRVS film produced by 3M Corporation is used. This film 62 is typically used in high definition projection televisions. The film 62 is preferably applied to an upper surface of the dial 12 and covers all surface area of the dial 12. The film 62 is preferably applied to a dial surface 14 that is opposite from the surface 16 where the reflective white layer of paint is applied.

The film 62, as used in a television application, includes a first surface having half spherical shapes and a second surface that is generally flat and shiny. When the film 62 is used in an instrument cluster application, the light path is reversed from the traditional path used for television applications. The shiny flat surface faces away from the vehicle occupant with the spherical surface facing the occupant. This configuration generates a small well-defined viewing angle. The film 62 does not absorb the light; the light is redirected through the film 62 to provide the well-defined viewing angle. Another advantage with this film 62 is that ambient light (sun light) does not reflect on this film 62 so the instrument cluster does not have to be placed deep within the instrument panel. This increases available packaging space for other instrument panel components. In this configuration, continuous illumination is necessary. In the absence of illumination, i.e. ignition off, the appearance of the display is black. This configuration provides a unique dash appearance in addition to significantly increasing light efficiency.

Although a preferred embodiment of this invention has been disclosed, a worker of ordinary skill in this art would recognize that certain modifications would come within the scope of this invention. For that reason, the following claims should be studied to determine the true scope and content of this invention.

The invention claimed is:

1. An instrument gauge display comprising:
    a dial;
    a light housing mounted to a circuit board and positioned underneath said dial;
    a light source mounted to said circuit board to illuminate at least a portion of said dial;
    a light guide mounted between said dial and said light housing wherein said dial or said light guide includes a plurality of graphical images indicating at least one vehicle operating condition, said plurality of graphical images being spaced apart from each other on an upper or lower surface of said dial; and
    a plurality of scattering elements supported by said light guide with at least a portion of a scattering element being positioned underneath each one of said graphical images, wherein each of said scattering elements comprises a predetermined area on said light guide and includes a layer of paint applied only on said predetermined areas, and wherein said scattering elements are divided into a plurality of zones based on light intensity with each zone defining a unique paint pattern for said predetermined areas of said scattering elements located within said respective zone with said light source and scattering elements cooperating to increase light efficiency in graphical image areas.

2. The display of claim 1 wherein each of said scattering elements comprises a textured surface on an upper or lower surface of said light guide.

3. The display of claim 2 wherein said light guide comprises a light transparent material having a different texture than said textured surface of said scattering elements.

4. The display of claim 1 wherein said plurality of zones includes at least a bright zone defined by a first light intensity, a dim zone defined by a second light intensity that is less than said first light intensity, and an intermediate zone defining a third light intensity greater than said second light intensity and less than said first light intensity.

5. The display of claim 4 wherein said dim zone defines a first paint pattern for each of said predetermined areas in said dim zone, said intermediate zone defines a second paint pattern for each of said predetermined areas in said intermediate zone, and said bright zone defines a third paint pattern for each of said predetermined areas in said bright zone wherein said first paint pattern comprises a completely paint filled area, said second paint pattern comprises a partially paint filled area having a first amount of surface area covered with paint, and said third paint pattern comprises a partially paint filled area having a second amount of surface area covered with paint, said second amount of surface area being less than said first amount of surface area.

6. The display of claim 1 wherein said light guide is defined by a variable thickness with the thickness of said light guide decreasing as the distance of said light guide from said light source increases.

7. The display of claim 1 wherein each of said scattering elements includes a layer of fluorescent paint applied in said predetermined areas.

8. The display of claim 1 wherein said graphical images comprises fluorescent paint applied to an upper or lower surface of said light guide and wherein said dial includes a layer of anisotropic film.

9. The display of claim 1 wherein said light housing is positioned directly between said circuit board and said light guide, said light housing being comprised of an opaque material that reflects light to illuminate the graphical image areas.

10. The display of claim 9 wherein one scattering element is positioned directly underneath each graphical image area.

11. The display of claim 10 wherein said plurality of scattering elements comprises at least a first scattering element defined by a first scattering element characteristic and a second scattering element defined by a second scattering element characteristic different from said first scattering element characteristic.

12. The display of claim 1 wherein said light housing is comprised of a light reflecting material.

13. The display of claim 1 wherein said light housing includes a generally planar base portion and at least one wall that extends outwardly from said generally planar base portion to support said dial.

14. An instrument gauge display comprising:
a dial having an upper dial surface and a lower dial surface and including a plurality of graphical images for indicating at least one vehicle operating conditioned and disposed on at least one of said upper or lower dial surfaces, said dial being comprised of a transparent material, and wherein said upper dial surface is partially covered with black paint with uncovered areas defining said graphical images and wherein said lower dial surface is covered with a semitransparent layer of white paint;
a light housing mounted to a circuit board and positioned underneath said dial, said light housing being comprised of a white opaque material that reflects light;
a light source mounted to said circuit board to illuminate at least a portion of said graphical image; and
a light guide mounted between said dial and said light housing, said light guide being comprised of a light transparent material and including a plurality of scattering elements with at least a portion of a scattering element being positioned generally underneath each one of said graphical images wherein said light source and scattering elements cooperate to increase light efficiency in graphical image areas, and wherein said light guide includes an upper light guide surface and a lower light guide surface with each of said scattering elements comprising a layer of white paint applied over predetermined areas on said lower light guide surface; and
wherein said scattering elements are divided into a plurality of zones including at least a bright zone defined by a first light intensity, a dim zone defined by a second light intensity that is less than said first light intensity, and an intermediate zone defining a third light intensity greater than said second light intensity and less than said first light intensity and wherein said dim zone defines a first paint pattern for each of said predetermined areas in said dim zone, said intermediate zone defines a second paint pattern for each of said predetermined areas in said intermediate zone, and said bright zone defines a third paint pattern for each of said predetermined areas in said bright zone with said first paint pattern comprising a completely paint filled area, said second paint pattern comprising a partially paint filled area having a first amount of surface area covered with paint, and said third paint pattern comprising a partially paint filled area having a second amount of surface area covered with paint, said second amount of surface area being less than said first amount of surface area.

15. The display of claim 14 wherein said light guide is defined by a variable thickness with the thickness of said light guide decreasing as the distance of said light guide from said light source increases.

16. A method for illuminating a graphical image on an instrument gauge display comprising the steps of:
(a) mounting a light housing to a printed circuit board;
(b) supporting a light guide within the light housing;
(c) forming a plurality of discrete scattering elements on the light guide including:
forming each of the scattering elements on a upper or lower surface of the light guide as a predetermined area including a layer of paint:
dividing the scattering elements into a plurality of zones including at least a bright zone defined by a first light intensity, a dim zone defined by a second light intensity that is less than the first light intensity, and an intermediate zone defined by a third light intensity greater than the second light intensity and less than the first light intensity; and
defining a first paint pattern for each of the predetermined areas in the dim zone, defining a second paint pattern for each of the predetermined areas in the intermediate zone, and defining a third paint pattern for each of the predetermined areas in the bright zone with the first paint pattern comprising a completely paint filled area, the second paint pattern comprising a partially paint filled area having a first amount of surface area covered with paint, and the third paint pattern comprising a partially paint filled area having a second amount of surface area covered with paint, the second amount of surface area being less than the first amount of surface area;
(d) positioning a dial defining a plurality of graphical images for indicating at least one vehicle operating condition and disposed above the light guide such that at least of portion of one of the scattering elements is positioned in an overlapping relationship to each of the graphical images;
(e) increasing light efficiency by illuminating the light guide such that the scattering elements direct light toward the graphical images.

17. The method of claim 16 further including the steps of forming the light guide from a light transparent material having a first texture and forming each of the scattering elements on an upper or lower surface of the light guide as a predetermined area having a second texture different than the first texture.

18. The method of claim 16 further including the step of decreasing the thickness of the light guide as the distance of the light guide from a light source increases.

19. The method of claim 16 including forming the light housing from a white opaque material that reflects light, and positioning the light housing directly between the circuit board and the light guide such that the light housing reflects light to illuminate the graphical images.

* * * * *